United States Patent [19]

Viaud

[11] Patent Number: 4,545,298

[45] Date of Patent: Oct. 8, 1985

[54] CYLINDRICAL BALER HYDRAULIC CIRCUIT FOR CONTROLLING BALE CHAMBER TENSION AND OPERATING BALE DISCHARGE GATE

[75] Inventor: Jean Viaud, Chargey-les-Gray, France

[73] Assignee: Deere & Company, Moline, Ill.

[21] Appl. No.: 618,620

[22] Filed: Jun. 8, 1984

[30] Foreign Application Priority Data

Jul. 4, 1983 [EP] European Pat. Off. ... EP83401369.0

[51] Int. Cl.[4] .............................................. B30B 5/06
[52] U.S. Cl. ........................................ 100/88; 56/341
[58] Field of Search ........................... 100/88, 89, 5, 7; 56/341, 342, 343, 344

[56] References Cited

U.S. PATENT DOCUMENTS

| | | | |
|---|---|---|---|
| 4,088,069 | 5/1978 | Soterdpulds | 100/88 |
| 4,218,866 | 8/1980 | Parrish | 100/88 X |
| 4,391,187 | 7/1983 | Koning et al. | 100/88 |
| 4,393,764 | 7/1983 | Viaud | 56/341 |
| 4,417,436 | 11/1983 | Campbell | 100/88 X |

*Primary Examiner*—Peter Feldman

[57] ABSTRACT

A cylindrical baler is comprised of an adjustable bale-forming chamber for forming spirally wound, cylindrical bales. A completed bale is discharged on the ground through a rear gate. The chamber is comprised of a plurality of longitudinally extending, side-by-side belts supported on a plurality of transverse rollers. The chamber is adjusted by a pair of belt tension rollers engaged with the bale chamber belts and supported between a pair of pivotally mounted belt tension arms which are displaceable as the diameter of a bale in the chamber increases during formation. A hydraulic circuit controls the tension applied to the chamber by the belt tension arms and rollers and also operates the bale discharge gate. A pair of hydraulic jacks are, respectively, mounted on each side of the baler and connected between the bale discharge gate and the belt tension arms. To properly tension the belts, a nonreturn valve isolates the hydraulic jacks from the tractor's hydraulic supply and the jack chambers are connected in closed circuit through an adjustable pressure valve to apply a resistance to fluid flow from one chamber of each jack to the other. The nonreturn valve is pilot controlled and is opened to permit return fluid flow to the tractor supply when the jacks are actuated to open the rear gate. Thus, each jack performs a double function of braking the movement of belt tension arms and rollers and operating the bale discharge gate, thereby, providing a simple, low cost, hydraulic circuit for belt tensioning and gate operation.

11 Claims, 4 Drawing Figures

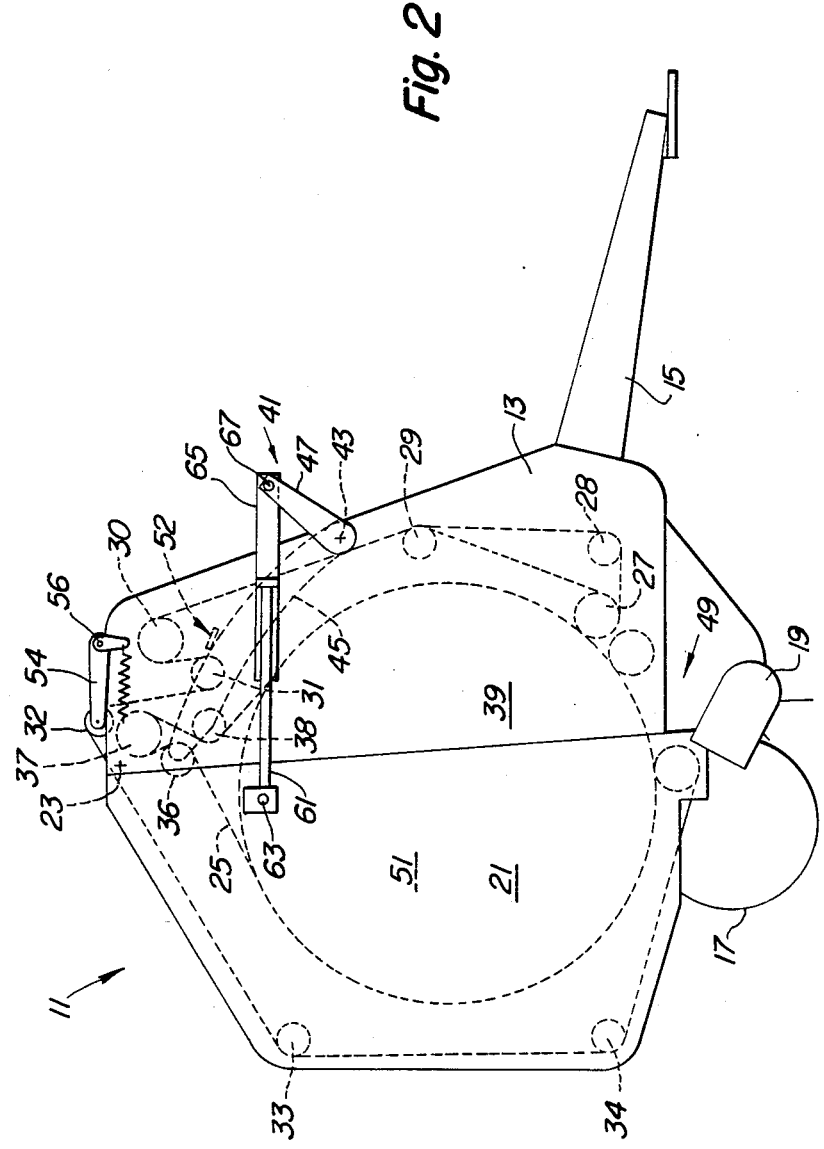

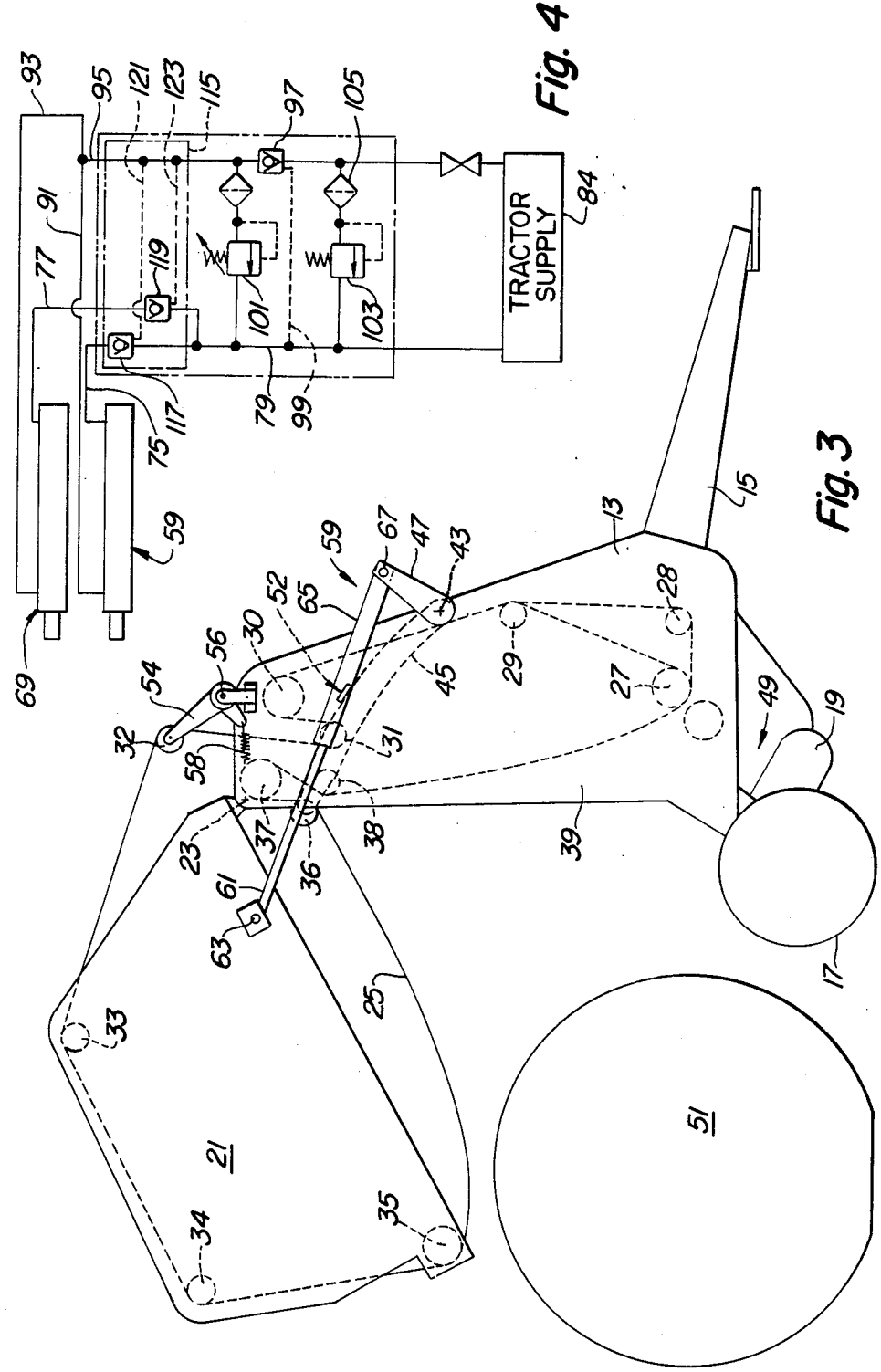

CYLINDRICAL BALER HYDRAULIC CIRCUIT FOR CONTROLLING BALE CHAMBER TENSION AND OPERATING BALE DISCHARGE GATE

BACKGROUND OF THE INVENTION

This invention relates to cylindrical balers and more particularly to a hydraulic circuit for controlling the tension of the bale chamber defining belts and the operation of the bale discharge gate.

One well-known type of cylindrical baler comprises at least one set of longitudinally extending side-by-side belts (e.g., metal or rubber and fabric construction) supported on a plurality of transverse rollers. The belts and rollers define an expandable chamber for forming cylindrical, spirally wound bales of crops such as hay and forage. To form a bale, the crops are picked up from the ground as the baler moves across the field. When the bale reaches a predetermined diameter, it is bound by being wrapped in twine in the bale-forming chamber. The bale is then discharged onto the ground through a rear gate.

Movement of the rear gate between an open and a closed position is controlled by a pair of jacks. One jack is disposed on each side of the baler. The jacks are actuated in one direction to open the gate for discharging a completed bale and then in the other direction to close the gate for formation of another bale. The volume or size of the bale-forming chamber formed by the belts increases to accommodate the increasing bale diameter during formation. The increase in chamber volume is produced by displacing some of the belt guide rollers which are typically journalled at their ends between a pair of arms extending respectively along each sidewall of the baler. Movement of the arms to increase the diameter or volume of the bale-forming chamber is restrained to ensure that the belts are properly tensioned to compress the crop material into a tightly wrapped, spirally wound, high density roll. A high density bale is desired for harvesting efficiency, bale integrity following discharge and improved storage life.

Springs are used to restrain the movement of the belt tensioning arms. Each tension arm includes a first portion extending along the inside of the sidewall and a second portion rigidly connected thereto extending along the outside of the sidewall. The springs are mounted externally of the sidewall and are connected to the second portion of the tension arm. The springs also apply a return force to the belt tension arms when the bale is discharged. The return force restores the arms to a position corresponding to a minimum volume of the chamber used at the beginning of the bale-forming operation.

Also, in combination with the springs for biasing the chamber tensioning arms or in lieu of them, a jack may be disposed on each side of the baler and mounted between the external, second portion of the belt tension arm and a fixed point on the baler frame. During bale formation, each jack operates in a closed circuit mode in which fluid goes from one side of the jack piston to the other through a circuit which provides a suitable resistance. As a result, the jack brakes the movement of the belt tensioning arms to maintain the belts in a properly tensioned condition. When the jacks are not used in combination with springs, a hydraulic circuit for the jacks operates the jacks to return the belt tensioning arms to the position for the initiation of bale formation.

The functions performed by the jacks for controlling the rear discharge gate of the baler and the jacks for controlling the belt tensioning arms are separate and, as such, require two independent or combined hydraulic circuits for controlling the independent functions.

Balers of this general type are disclosed in U.S. Pat. Nos. 4,391,187 and 4,252,057.

SUMMARY OF THE INVENTION

Accordingly, it is an object of this invention to provide a cylindrical baler which comprises a single, and, therefore, simplified hydraulic circuit for actuating the rear gate of the baler and for maintaining tension in the bale chamber belts.

This and other objects of the invention which will be apparent from a consideration of the following detailed description and accompanying claims are accomplished in a cylindrical baler as follows. The baler comprises a frame with a front section and a rear gate. A plurality of belts are supported on and extend around a plurality of guide and tensioning rollers rotatably mounted in the front section and rear gate. The belts and rollers define an expandable chamber for forming cylindrical, spirally wound bales. At least one of the rollers is rotatably mounted on a belt tensioning arm, and the arm and roller are displaceable together to adjust the size of the bale-forming chamber as the diameter of a bale increases during formation. A hydraulic circuit is selectively operated to resist movement of the arm during bale formation and to open and close the gate following bale formation.

In accordance with the improvement of this invention, the circuit comprises a hydraulic jack connected between the rear gate and the belt tensioning arm. The two functions of maintaining belt tension and controlling the rear gate are combined in a single jack or a single pair of jacks in which one of the jacks is fixed on each sidewall of the baler between the belt tension arm and rear gate. The hydraulic circuit means is thus substantially simplified in construction and consequently reduced in cost.

In the preferred embodiment, the hydraulic jack is a double acting cylinder with adjustable chambers formed on each side of the piston. The circuit means includes a fluid supply connected to each of the chambers and means for selectively (1) connecting the chambers in closed circuit and in isolation from the fluid supply during bale formation and (2) connecting the jack to the supply to open and close the bale discharge gate following bale formation.

In balers of this type, it is known to provide an abutment to stop movement of the belt tensioning arm in a position corresponding to the preferred diameter of the bale when formation is complete. This abutment serves to immobilize the end of the jack connected to the belt tensioning arm when it is desired to open the rear gate by actuation of the jack.

The circuit includes a pair of conduits, respectively, connecting each jack chamber to the fluid supply. In accordance with another feature of the invention, a nonreturn valve for preventing return fluid flow to the fluid supply is connected in one conduit which connects one of the jack chambers to the fluid supply for discharging fluid from the jack during displacement of the belt tensioning arms during bale formation. A connecting means joins the two conduits at a position between the nonreturn valve and the jack to transmit the discharge fluid from one jack chamber to the other. The connecting means may be constituted by an adjustable discharge valve or a constriction to provide fluid flow resistance in the circuit path between the two chambers. This fluid flow resistance restricts movement of the belt tensioning arms and thereby maintains the required tension in the belts during bale formation.

In accordance with another feature of the invention, the nonreturn valve is pilot controlled and is positively opened when fluid is passed under pressure through the other conduit for positive actuation of the jack to open the rear gate of the baler.

In accordance with still another feature of the invention, a pressure limiting valve is connected between the two conduits at a location between the fluid supply and the nonreturn valve to limit the actuating pressure of the jack when the jack is actuated to close the rear gate of the baler. By limiting the actuating pressure of the jack, damage to the baler may be avoided which may occur if the driver has not maneuvered the baler such that the rear gate may be closed without hitting the bale which has just been ejected onto the ground.

In accordance with still another feature, actuation of the jack to close the rear gate simultaneously returns the belt tensioning arm to a position corresponding to a minimum volume of the chamber.

In accordance with a feature of an alternate embodiment of the invention, the other conduit of the circuit means may include a pilot controlled, nonreturn valve for opposing the return flow of fluid from the jack to the supply when the rear gate is being closed. The nonreturn valve prevents an accidental closure of the gate if the conduit should rupture. When fluid is fed under pressure for voluntarily closing the gate, the pressure opens the pilot controlled valve and permits the fluid to return to the supply.

The fluid supply may comprise a pump and a tank which are disposed on the baler or on the tractor to which the baler is attached.

BRIEF DESCRIPTION OF THE DRAWINGS

FIG. 2 is a side elevational view of the baler of FIG. 1 showing the baler with a completely formed bale in the bale-forming chamber just prior to discharge. The hydraulic circuit shown in FIG. 1 is omitted for convenience.

FIG. 3 is a side elevational view of the baler of FIG. 1 showing the baler immediately following discharge of a completed bale from the bale-forming chamber. The hydraulic circuit shown in FIG. 1 is omitted for convenience.

FIG. 4 is a schematic diagram of an alternate embodiment of the hydraulic circuit shown in FIG. 1.

DESCRIPTION OF THE PREFERRED EMBODIMENT

Figure 1:
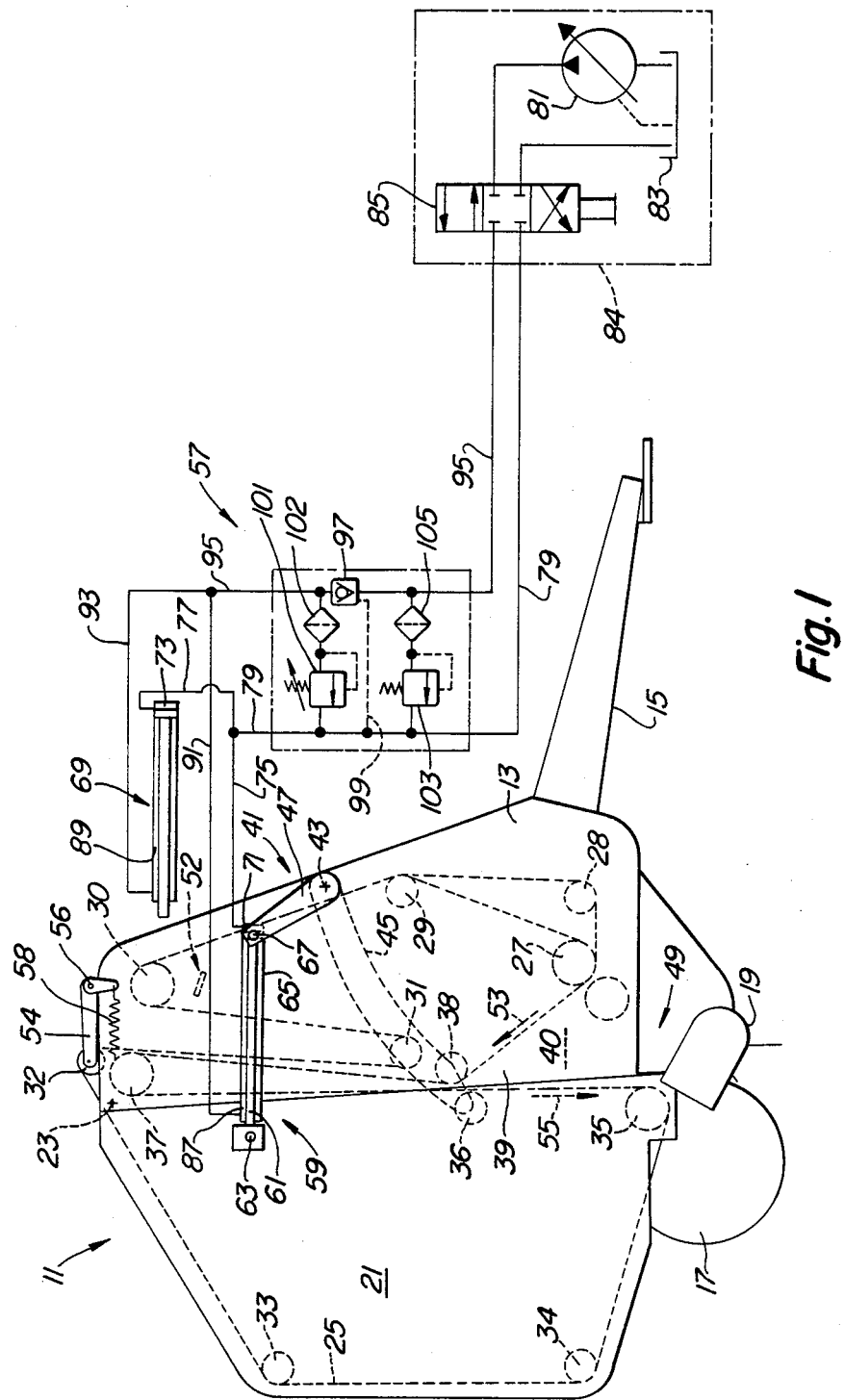
FIG. 1 is a partially schematic, side elevational view of a cylindrical baler in accordance with a preferred embodiment of this invention.

Reference is now made to FIGS. 1-3 illustrating a preferred embodiment of a cylindrical baler 11 in accordance with the invention herein. Baler 11 comprises a front section 13 which is supported on a chassis (not shown specifically). A tow bar 15 is connected to the forward end of the front section for coupling to a tractor (not shown) for operation of the baler as is conventional. The chassis is supported on the ground by a pair of wheels 17 (only one shown). A crop pickup 19 is fixed to the chassis immediately forward of wheels 17 and is used to feed crop, such as forage or hay, from the ground into baler 11 as baler 11 is pulled through a field. A bale discharge gate is pivotably mounted to front section 13 on pivot 23 for movement between a closed position for bale formation illustrated in FIG. 1 and an open position for bale ejection illustrated in FIG. 3.

Baler 11 comprises a plurality of longitudinally extending, side-by-side belts 25 supported on and extending around a plurality of transversely extending, rotatably mounted, guide and tensioning rollers 27-38 transversely extending between a spaced pair (left and right) of sidewalls 39 (only the right-hand sidewall shown). The belts 25 and rollers 27-38 define an expandable chamber for forming cylindrical, spirally wound bales in a conventional manner. Rolls 27-31, 33-35 and 37 act as guide rollers and are rotatably mounted about a fixed axis in the front section 13 and rear gate 21 of baler 11. Rolls 36, 38 are belt tensioning rollers and are journalled in a pair of spaced (left and right) bale tension arms 41 which are pivotally mounted in sidewalls for rotation about an axis 43. Only one (right) of the arms 41 is shown in FIGS. 1-3. Right arm 41 includes an inner segment extending along the inside of right sidewall 39 and an outer segment 47 extending along the outside of right sidewall 39. Inner segment 45 is rigidly fixed to and movable with outer segment 47 about pivot axis 43. The second or left arm 41 (not shown) is a mirror image of the right arm 41 and extends on each side of the opposite (left) sidewall 39 (not shown).

As is well-known, crops introduced into chamber 40 through an inlet 49 are rolled by action of belts 25 to form a core for the eventual bale. Rolls 36, 38 are movable upwardly by pivotal movement of belt tension arms 41 about pivot axis 43 to enable the bale-forming chamber 40 to expand increasingly to accommodate the increasing diameter of a cylindrical bale 51. Rotation of arms 41 about axis 43 is limited by abutments 52 (only one shown) located on each sidewall 39. The core of bale 51 results from oppositely moving stretches of belts 25 which move in the direction of arrows 53, 55.

Guide roll 32 is mounted between a spaced pair of elbow levers 54 (only the right-hand lever being shown) pivotally mounted, respectively, to the left and right sidewalls 39, and is adjustable between the positions shown in FIGS. 1 and 3 to take up slack in belts 25 when gate 21 is opened for bale discharge. The left-hand elbow lever (not shown) is a mirror image of the right-hand elbow lever 54 and for convenience, only right-hand elbow lever 54 will be described in detail herein. Lever 54 is pivotally mounted to front section 13 on a pivot 56. A return spring 58 is connected between one end of lever 54 and a fixed point on front section 13 and biases lever 54 in a clockwise direction.

The operation of baler 11 as described to this point is well-known to those skilled in the art and will not be described in detail herein. See, for example, U.S. Pat. No. 4,252,057 and U.S. Pat. No. 4,391,187 as illustrative of the bale-forming operation of such balers.

To tension belts 25 properly and thereby compress the crop into a bale 51, arms 41 are subject to a force or resistance to resist pivotal movement in a clockwise direction about axis 43 to increase the volume of chamber 40.

A hydraulic circuit 57 which is the subject matter of this invention, will now be described primarily in reference to FIG. 1. Circuit 57 provides means (1) for resisting movement of arm 41 during bale formation and (2) for opening and closing gate 21 following bale formation. Circuit 57 includes a jack 61 comprising (1) a piston rod 61 connected to a pivot 63 on bale discharge gate 21 and (2) a housing 65 connected to a pivot 67 on the outer segment 47 of belt tension arm 41. In the preferred embodiment, a second hydraulic jack 69 is connected between bale discharge gate 21 and the belt tension arm (not shown) on the left side of baler 11 in an identical manner to the connection of jack 59 between gate 21 and right belt tension arm 41. Jack 69 is schematically illustrated in circuit 57 shown in FIG. 1.

One chamber 71 of jack 59 and one chamber 73 of jack 69 are connected by conduits 75, 77, respectively, to a conduit 79. Conduit 79 is connected to a hydraulic pump 81 or to a reservoir 83 of a tractor hydraulic supply 84 via a tractor supply control valve 85. The other chamber 87 of jack 59 and the other chamber 89 of jack 69 are connected by conduits 91, 93, respectively, to another conduit 95 of circuit 57. Conduit 95 is also connected to pump 81 or reservoir 83 via control valve 85.

Circuit 57 further includes means for selectively connecting chambers 87, 89 in closed circuit with chambers 71, 73, respectively, and in isolation from valve 85. Return fluid flow from chambers 87, 89 is selectively prevented by a low leakage, pilot controlled, nonreturn valve 97 in conduit 95. Valve 97 is opened when conduit 79 and a pilot control conduit 99 are pressurized by supply 84. An adjustable discharge valve 101 and filter 102 are connected between conduits 95, 79 at a location between jacks 59, 69 and nonreturn valve 97. Valve 101 permits liquid to flow from conduit 95 to conduit 79 while applying a resistance to the flow to restrain upward movement of arms 41 during bale formation as illustrated in the movement of right arm 41 from the position shown in FIG. 1 to the position shown in FIG. 2.

A pressure limiting valve 103 and a filter 105 are connected between conduits 95, 79 in a location between nonreturn valve 97 and control valve 85. Valve 103 limits the pressure for actuation of jacks 59, 69 to close bale discharge gate 21 and, thereby, prevents damage to baler 11 if the closure of gate 21 is for some reason physically restrained when circuit 57 is actuated.

Hydraulic circuit 57 is operated in the following manner. During the formation of a bale 51 in chamber 40 of baler 11, no pressure is transmitted to jacks 59, 69 from tractor pump 81. Control valve 85 is in the neutral position. The increasing diameter of bale 51 during formation causes arms 41 to pivot about axis 43. Movement of arm 41 clockwise about axis 43 moves the housings of jacks 59, 69 to the right as shown in FIG. 2. As a result, fluid in chambers 87, 89 of jacks 59, 69 is displaced through conduits 91, 93 toward conduit 95 while fluid flows into chambers 71, 73 of jacks 59, 69, respectively. Nonreturn valve 97 prevents fluid flow through conduit 95 to the tractor supply 84. As a result of the pressurization of conduit 95 upstream of valve 101, valve 101 is opened to permit fluid flow from conduit 95 to conduit 79 and then through conduit 75 into chamber 71 and through conduit 77 into chamber 73. The resistance to movement of arms 41 during bale formation may be controlled by adjustment of the pressure at which valve 101 is opened. It will, thus, be seen that hydraulic circuit 57 provides a closed circuit path between jacks 59, 69 and provides the required resistance via the operation of valve 101 to maintain belts 25 in a properly tensioned condition during bale formation.

It will be noted that during bale formation, valve 97 prevents fluid flow to supply 84 even though valve 85 is in a neutral or closed position. This is because many control valves 85 on commercially available tractors permit an intolerably high level of leakage to maintain proper belt tension.

As bale 51 increases in diameter, belt tension arm 41 moves toward abutment 52. When bale 51 reaches its finished diameter, arm 41 abuts abutment 52 to limit movement of arm 41 to the position shown in FIG. 2. This immobilizes arm 41 and the respective housings of jacks 59, 69 connected thereto.

After the bale has been tied, by a mechanism which is not shown, bale 51 is discharged to the ground. To discharge bale 51, the driver of the tractor actuates hydraulic circuit 57 to raise bale discharge gate 21 by pivoting about an axis 23. The opening of gate 21 is initiated by shifting control valve 85 to the right (FIG. 1) causing fluid flow in conduit 79 to jack chamber 71, 73. Fluid flow into chambers 71, 73 extends jacks 59, 69, respectively. Fluid pressure in conduit 79 also opens nonreturn valve 97 via pilot control conduit 99 providing a fluid return path from chambers 87, 89 via conduit 95.

When gate 21 is raised, spring 58 causes elbow lever 54 to pivot about pivot 56 and move roller 32 in a clockwise path to take up the slack which is produced in belts 25. After bale 51 is discharged, the operator closes gate 21 by reversing the flow of fluid in conduits 79, 95 by shifting control valve 85 to the left (FIG. 1) to cause fluid flow through conduits 95, 91, 93 and into jack chambers 87, 89, respectively. The return fluid flow from chambers 71, 73 takes place through conduits 75, 77, 79 and into reservoir 83. The fluid flow into jack chambers 87, 89 causes the retraction of jacks 59, 69 to move bale discharge gate 21 from an open to a closed position.

When gate 21 is being closed, pressure limiting valve 103 limits the pressure which can be applied to jacks 59, 69 to cause gate 21 to close by short circuiting excess pressure between conduits 95, 79. The pressure acting on jack 59, 69 is limited to avoid damage which could result from an operator error. Such operator error could occur, for example, if the operator did not maneuver the baler to a location where gate 21 could be closed without gate 21 hitting bale 51 resting on the ground and physically restraining the closure of gate 21.

Retraction of jacks 59, 69 also returns belt tension arms 41 and belt tension rollers 36, 38 carried thereon to the position shown in FIG. 1 by a counterclockwise rotation about pivot 43 to restore bale chamber 40 to a minimum volume and to the position for initiation of bale formation. In addition, elbow levers 54 and roller 32 supported thereon are rotated counterclockwise about the pivot 56 against the force of spring 58 to its initial position (shown in FIG. 1) for initiation of bale formation.

In accordance with an alternate embodiment of circuit 57 shown in FIG. 4, circuit 57 includes a safety mechanism 115 for preventing accidental closure of gate 21 if a conduit ruptures while gate 21 is open. Except for safety mechanism 115, the embodiment of circuit 57 shown in FIG. 4 is identical to the embodiment shown in FIG. 1.

The safety means 115 includes a pair of pilot controlled, nonreturn valves 117, 119 in lines 75, 77, respectively, between jacks 59, 69 and conduit 79. Nonreturn valves 117, 119 are positively openable by pressurization of line 95 via pilot control conduits 121, 123. Thus, when rear gate 21 of baler 11 is in an open position, the rupture of a conduit downstream of nonreturn valves 117, 119 does not permit a return flow of fluid from chambers 71, 73 of jacks 59, 69 to the tractor supply 84 by virtue of pilot controlled nonreturn valves 117, 119. By preventing the return flow from jacks 59, 69, gate 21 is prevented from accidentally closing. When pressure is applied by an operator via conduit 95 to move gate 21 from an open to a closed position, that pressure is applied via pressure control conduits 121, 123 to open nonreturn valves 117, 119, respectively, and, thus, permit a return flow of fluid from chambers 71, 73 of jacks 59, 69, respectively.

This invention has been explained in connection with certain preferred embodiments thereof. However, it will be appreciated by those skilled in the art that other modifications and variations of these embodiments are possible. Accordingly, it is intended that all such variations and modifications are comprehended within the true spirit and scope of the invention herein as defined by the appended claims.

I claim:
1. In a cylindrical baler comprising:
   a front section;
   a rear bale discharge gate connected to said front section;
   a plurality of guide and tensioning rollers rotatably mounted in the front section and rear gate;
   a plurality of belts supported on and extending around said rollers, said belts and rollers defining an expandable chamber for forming cylindrical bales, said gate movable between an open position for bale discharge and a closed position for bale formation;
   a movably mounted, belt tension arm; and
   at least one roller supported on and movable with said arm for tensioning said belts; and
   a hydraulic circuit means for resisting movement of said arm during bale formation and for opening and closing said gate following bale formation; the improvement wherein:
   said circuit means includes a hydraulic jack connected between said belt tension arm and said gate.
2. The baler of claim 1 wherein:
   said jack comprises a housing, a piston in said housing and a pair of adjustable chambers formed in said housing on respective sides of said piston; and
   said circuit means includes a fluid supply connected to each of said chambers and means for selectively connecting said chambers in closed circuit and in isolation from said supply during bale formation and connecting said jack chambers to said supply to open and close said gate following bale formation.
3. The baler of claim 1 wherein:
   said frame comprises a pair of spaced sidewalls; and
   said jack is on one of said sidewalls.
4. The baler of claim 3 further comprising a second jack on the other of said sidewalls.
5. The baler of claim 4 wherein said jacks are connected in parallel in said circuit means.
6. The baler of claim 1 further comprising an abutment for limiting the movement of said belt tension arm when a bale in said chamber reaches a predetermined diameter to immobilize the end of said jack connected to said arm.
7. The baler of claim 2 wherein said circuit means comprises:
   a first conduit for connecting one of said chambers to said supply to discharge fluid when said jack is extended;
   a second conduit connecting the other chamber to said supply when said jack is retracted;
   a nonreturn valve in said first conduit for preventing return flow to said supply; and
   a connecting means between said first and second conduits at a location between said nonreturn valve and said jack to transmit fluid in closed circuit from said one chamber to the other.
8. The baler of claim 7 wherein said connecting means comprises an adjustable discharge valve.
9. The baler of claim 7:
   wherein said nonreturn valve is pilot controlled in response to fluid flow in said second conduit responsive to the actuation of said jack to open said gate.
10. The baler of claim 7 wherein said circuit means comprises a pressure limiting valve connected between said first and second conduits and between said supply and said nonreturn valve.
11. The baler of claim 1 wherein said circuit means comprises a fluid supply, a conduit connected between said jack and said supply for return fluid flow to said supply from said jack when said gate is being closed and a pilot controlled nonreturn valve in said conduit for opposing said return flow.

* * * * *